US012098829B2

(12) United States Patent
Xie et al.

(10) Patent No.: US 12,098,829 B2
(45) Date of Patent: Sep. 24, 2024

(54) LAMP MOUNTING STRUCTURE AND LAMP

(71) Applicants: SUZHOU OPPLE LIGHTING CO., LTD., Suzhou (CN); OPPLE LIGHTING CO., LTD., Shanghai (CN)

(72) Inventors: Jianmin Xie, Suzhou (CN); Qingquan Zhang, Suzhou (CN); Xingchen Tan, Suzhou (CN)

(73) Assignees: SUZHOU OPPLE LIGHTING CO., LTD., Suzhou (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/437,523

(22) Filed: Feb. 9, 2024

(65) Prior Publication Data

US 2024/0230073 A1 Jul. 11, 2024

Related U.S. Application Data

(63) Continuation of application No. PCT/CN2022/111306, filed on Aug. 10, 2022.

(30) Foreign Application Priority Data

Aug. 11, 2021 (CN) ......................... 202110917458.3
Aug. 11, 2021 (CN) ......................... 202121867717.8

(51) Int. Cl.
*F21V 21/30* (2006.01)
*F21V 17/16* (2006.01)
*F21V 17/18* (2006.01)

(52) U.S. Cl.
CPC .............. *F21V 21/30* (2013.01); *F21V 17/16* (2013.01); *F21V 17/18* (2013.01)

(58) Field of Classification Search
CPC ..................... F21V 17/16–18; F21V 21/26–30
See application file for complete search history.

(56) References Cited

U.S. PATENT DOCUMENTS

2019/0277464 A1 9/2019 Won

FOREIGN PATENT DOCUMENTS

CN 105864610 A 8/2016
CN 205604915 U 9/2016
(Continued)

OTHER PUBLICATIONS

International Search Report issued on application No. PCT/CN2022/111306, dated on Sep. 27, 2022 with English translation, (7p).

*Primary Examiner* — Jason M Han
(74) *Attorney, Agent, or Firm* — Arch & Lake LLP; Shen Wang; Zhangyuan Ji

(57) ABSTRACT

The present disclosure provides a lamp mounting structure and a lamp, and the lamp mounting structure includes a mounting assembly, a connection assembly and a chassis assembly, the mounting assembly is fixedly mounted on a mounting wall, the chassis assembly is fixedly connected with a lamp main body, the connection assembly includes a first connection assembly and a second connection assembly, two ends of the first connection assembly are rotatably connected with the mounting assembly and the chassis assembly, and a first lock catch part is provided on the mounting assembly, at least one second lock catch part is provided at a position, corresponding to the first lock catch part, of the chassis assembly, and the first lock catch part and the second lock catch part are in a lock catch connection.

10 Claims, 12 Drawing Sheets

(56) References Cited

FOREIGN PATENT DOCUMENTS

| | | | |
|---|---|---|---|
| CN | 205938632 | U | 2/2017 |
| CN | 209819353 | U | 12/2019 |
| CN | 113551206 | A | 10/2021 |
| CN | 215929498 | U | 3/2022 |

LAMP MOUNTING STRUCTURE AND LAMP

CROSS REFERENCES TO RELATED APPLICATIONS

This application claims the priority of PCT patent application No. PCT/CN2022/111306 filed on Aug. 10, 2022 which claims priority to the Chinese patent application with the number of 202110917458.3 filed on Aug. 11, 2021 and the Chinese patent application with the number of 202121867717.8 filed on Aug. 11, 2021, and the entire contents of which are incorporated by reference herein for all purposes.

TECHNICAL FIELD

The present disclosure relates to a technical field of lighting devices, and in particular, relate to a lamp mounting structure and a lamp.

BACKGROUND

Ceiling lamps have become the most common ceiling lamp for indoor lighting due to their characteristics such as being closer to natural lighting, and the ceiling lamps are widely used in various occasions such as homes, offices, and entertainment venues and so on.

SUMMARY

The present disclosure provides a lamp mounting structure.

The present disclosure provides a lamp mounting structure that may be used for assembling a lamp on a mounting wall, the lamp mounting structure may include: a mounting assembly, a connection assembly, and a chassis assembly.

The mounting assembly may be fixedly mounted on the mounting wall, the chassis assembly may be fixedly connected with a lamp main body of the lamp; the connection assembly may include a first connection assembly and a second connection assembly, two ends of the first connection assembly may be rotatably connected with the mounting assembly and the chassis assembly, to form a first rotating part and a second rotating part; one end of the second connection assembly may be rotatably connected with an end, away from the first rotating part, of the mounting assembly, the other end of the second connection assembly may be rotatably connected with the second connection assembly located between the first rotating part and the second rotating part.

A first lock catch part may be provided on the mounting assembly, at least one second lock catch part may be provided at a position, corresponding to the first lock catch part, of the chassis assembly, and the first lock catch part and the second lock catch part may be in a lock catch connection.

It is to be understood that both the foregoing general description and the following detailed description are exemplary and explanatory only and are not restrictive of the present disclosure.

BRIEF DESCRIPTION OF DRAWINGS

In the following, combined with the accompanying drawings, a detailed description of the specific implementation of the present disclosure will be provided to make the technical solutions and other beneficial effects of the present disclosure obvious.

FIG. 19 is a stereogram of a limiting elastic sheet and a detachment assembly in

FIG. 16.

DETAILED DESCRIPTION

Figure 1:
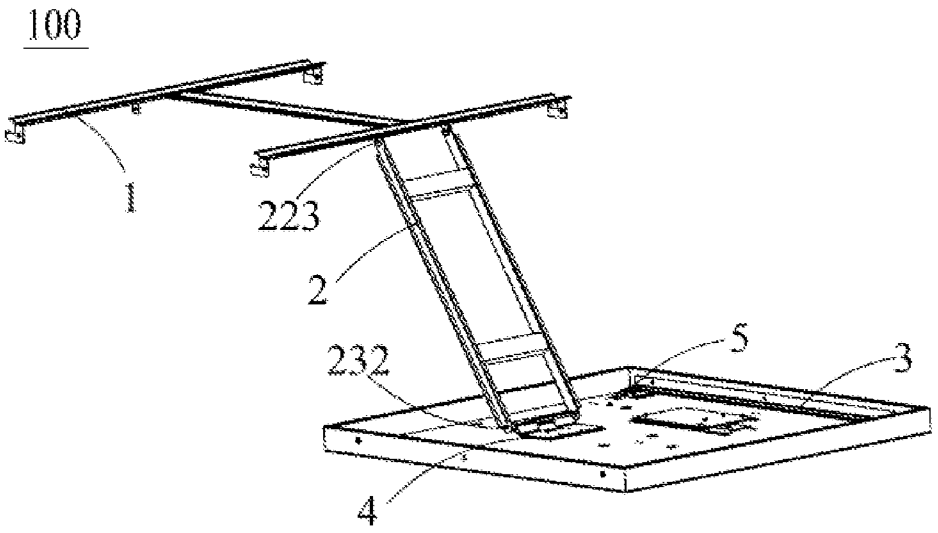
FIG. 1 is a stereogram of a lamp mounting structure provided by a first example of the present disclosure.

In order to make the purpose, technical solutions and advantages of the present disclosure clearer, the present disclosure will be described in detail below with reference to the drawings and examples.

Here, it should be noted that, in order to avoid obscuring the present disclosure with unnecessary details, only the structures and/or processing steps closely related to the solutions of the present disclosure are shown in the drawings, and other details less relevant to the present disclosure are omitted.

Additionally, it should be noted that, the terms "comprises," "comprising," "includes," "including," or any other variation thereof are intended to cover a non-exclusive inclusion, such that a process, a method, an article, or a device that includes a list of elements includes not only those elements, but also includes other elements not expressly listed or includes elements that are inherent to the process, the method, the article or the device.

Certain ceiling lamp includes a bottom shell, a light source and a lampshade. When installing, generally, it is necessary to remove the lampshade or remove both the lampshade and the light source first, and fix the bottom shell on the wall or ceiling, then install and connect the light source, and finally install the lampshade on the bottom shell.

Due to a large area of the ceiling lamp, the visual condition is extremely poor. In addition, it is also a high-altitude operation, and the installation process is quite complex, multiple people are required to assist in completing the installation, thereby resulting in high difficulty and high cost, as well as low installation efficiency. Moreover, in the later maintenance and cleaning process of the ceiling lamp, due to the inconvenience of mounting and disassembly, it also takes time and effort for the staff to disassemble and assemble.

Especially during the installation process of large-quality ceiling lamps, it is basically impossible for one person to carry the lamp and work at the high altitude. It is also easy to damage the ceiling lamp when multiple people work together. During the installation process, it is also easy to block the clamping position due to visual issues, which cannot meet the transposition requirements for suspended operations. The installation process is time-consuming and labor-intensive, and the installation cost is high.

In view of this, it is necessary to provide a lamp mounting structure and a lamp to solve the above problems.

First Example

Please refer to FIG. 1 to FIG. 9, a lamp mounting structure 100 is provided by the first example of the present disclosure. The lamp mounting structure 100 includes a mounting assembly 1, a connection assembly 2 and a chassis assembly 3. The mounting assembly 1 is fixedly mounted on a mounting wall, and the chassis assembly 3 is fixedly connected to a lamp main body (not shown), and the mounting assembly 1, the connection assembly 2 and the chassis assembly 3 are rotatably connected head and tail in sequence to form a Z-shaped structure. This arrangement can solve the problem of poor viewing angle when aligning and installing the lamp, and at the same time can realize the transposition requirements for suspended operations, making the installation process of lamps time-saving, labor-saving, efficient, safe, and the lamps can be installed and disassembled by a single person.

Figure 2:
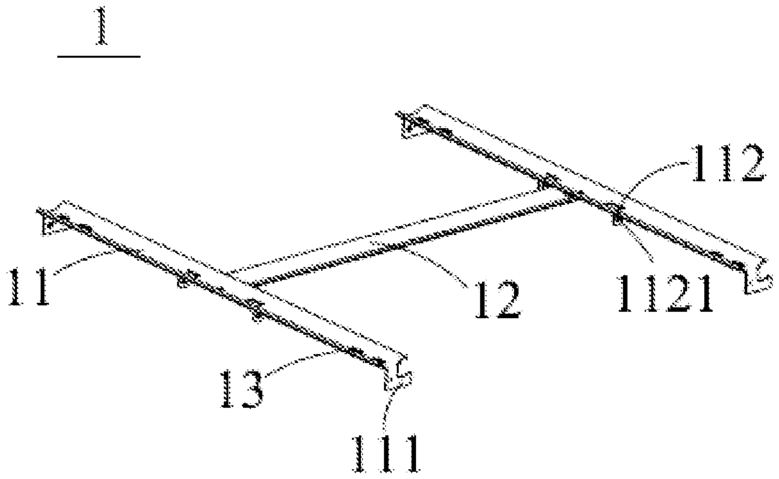
FIG. 2 is a stereogram of a mounting assembly in FIG. 1.

Please refer to FIG. 2, and in conjunction with FIG. 1, the mounting assembly 1 is made of a conventional plate and can be made into the required shape according to customer requirements and mounting environment, such as a circular shape, a square shape, a shape of a Chinese character "工", etc, which is not limited in the present disclosure. In an example of the present disclosure, the mounting assembly 1 includes a pair of first installation parts 11 arranged in parallel and a second installation part 12 arranged vertically between the two first installation parts 11. Two ends of the second installation part 12 are fixed on the middle portions of the two first installation parts 11 respectively, so that the entire mounting assembly 1 is in a "工"-shaped structure. By providing the "工"-shaped mounting assembly 1, the mounting assembly 1 has a simple structure, it is convenient to produce, and the mounting assembly 1 has the advantages of stable mounting and strong load-bearing capacity, and can be widely used for installing various types of ceiling lamps, chandeliers and other lamps. Preferably, two long sides of each of the first installation parts 11 extend downward and inward from the edge portion to the middle portion, so that each of the first installation parts 11 has an arc-shaped structure. A mounting hole 13 is opened in each of the first installation parts 11, and the mounting assembly 1 is fixed on the mounting wall by using fasteners such as expansion screws. It can be understood that, the mounting wall may be a wall, a suspended ceiling or a ceiling, which is not limited in the present disclosure.

The mounting assembly 1 is provided with a first lock catch part 111, and at least one second lock catch part 5 is provided at a position, corresponding to the first lock catch part 111, of the chassis assembly 3, and the first lock catch part 111 and the second lock catch part 5 are in a lock catch connection. By providing the locking cooperation between the first lock catch part 111 and the second lock catch part 5, the mounting difficulty of the lamp is reduced, the mounting efficiency of the lamp is improved, single-person mounting and disassembly is realized, and the mounting cost is reduced. It should be noted that, the specific number and the arrangement positions of the first lock catch part 111 and the second lock catch part 5 are not limited by the present disclosure, as long as the first lock catch part 111 and the second lock catch part 5 are set correspondingly, and the first lock catch part 111 and the second lock catch part 5 can also be flexibly set according to the specific structures of the mounting assembly 1 and the lamp.

Figure 3:
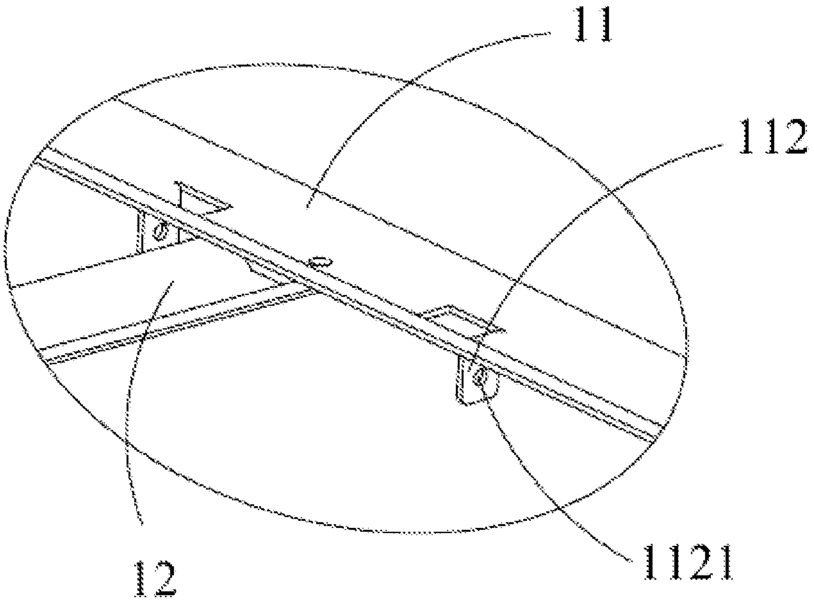
FIG. 3 is a partial enlarged view of FIG. 2.

Please continue to refer to FIG. 2 and FIG. 3, first lock catch parts 111 are provided on the sides of the first installation parts 11 away from the mounting wall. There are four first lock catch parts 111 provided. Each of the first lock catch parts 111 is located at an end of the first installation parts 11, and the first lock catch parts 111 are symmetrically distributed on two sides of each of the first installation parts 11 respectively. With this arrangement, the lamp can be hung on the mounting assembly 1 stably and with balanced force during the mounting process. Of course, there may also be two first lock catch parts 111 provided. The two first lock catch parts 111 are provided on the first installation parts 11 respectively and are symmetrically provided on two sides of the second installation part 12. In addition, the first lock catch parts 111 may not be provided at the ends of the first installation parts 11, and may also be provided at other positions of the first installation parts 11, which is not limited by the present disclosure.

The ends, at the side away from the mounting wall, of each first installation part 11 extend downward to form the L-shaped first lock catch parts 111. Preferably, the L-shaped first lock catch parts 111 are L-shaped hooks. Horizontal extension directions of the L-shaped hooks are the same to facilitate the locking cooperation with the second lock catch parts 5 on the chassis assembly 3. Of course, the horizontal extension directions of the hooks located at two ends of the first installation part 11 may also be different, as long as the hooks can be connected with the second lock catch part 5 in a locking manner. It should be noted that, the first lock catch parts 111 can be integrally formed with the first installation parts 11, or can be assembled on the first installation parts 11.

Figure 4:
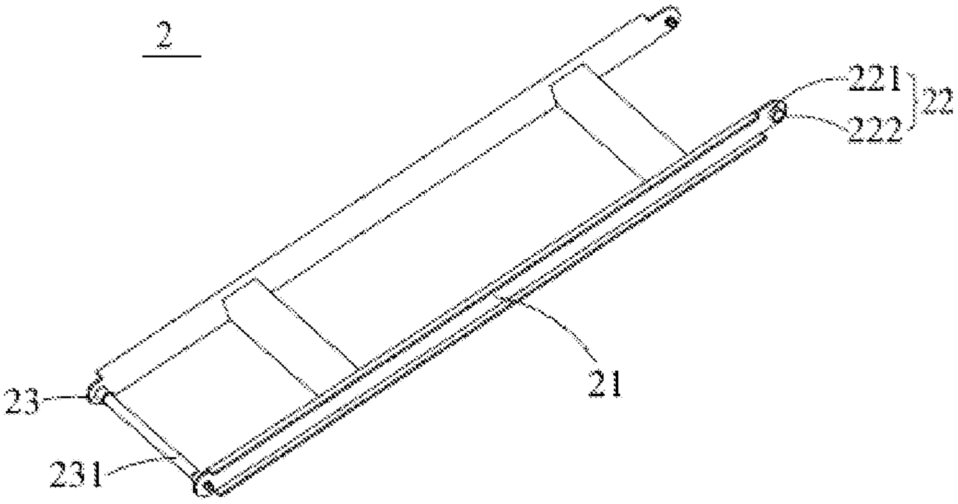
FIG. 4 is a stereogram of a connection assembly in FIG. 1.

Please refer to FIG. 4, the connection assembly 2 includes a pair of connection rods 21 provided in parallel, and includes a first connection part 22 and a second connection part 23 located at two ends of each connection rod 21. The mounting assembly 1 is rotatably connected to the first connection parts 22, the chassis assembly 3 is rotatably connected to the second connection part 23 to form a first rotating part 223 and a second rotating part 232 respectively. Such an arrangement can make the connection assembly 2 have sufficient strength, and the lamp main body can be temporarily placed in the air to meet the transposition requirements of suspended operations.

Each of the first connection parts 22 includes a first connection hole 221 and a connection member 222. The side, away from the mounting wall, of the mounting assembly 1 extends downward at the position corresponding to the first connection part 22 to form a third connection part 112 (please refer to FIG. 2 and FIG. 3). The third connection part 112 is provided with a second connection hole 1121 at a position corresponding to the first connection hole 221. The connection member 222 passes through the first connection hole 221 and the second connection hole 1121 to rotatably connect the mounting assembly 1 to the first connection part. The connection member 222 may be a rotating pin, a rotating rivet, a rotating shaft, etc., which is not limited by the present disclosure. The first connection part 22 and the third connection part 112 are rotatably connected through the connection member 222, so that the connection assembly 2 can freely rotate around the corresponding first rotating part 223 to drive the chassis assembly 3 to move toward a direction closer to the mounting assembly 1.

The second connection part 23 includes a rotating shaft 231, and the connection assembly 2 is rotatably connected to the chassis assembly 3 through the rotating shaft 231. The connection assembly 2 can be rotatably connected to the chassis assembly 3 directly through the second connection part 23, or rotatably connected to the chassis assembly 3 through a snap-fit assembly 4. In one example of the present disclosure, a support (not shown) is provided on the side of the chassis assembly 3 facing the connection assembly 2 corresponding to the position of the second connection part 23, and a third connection hole (not shown) is provided on the support. The rotating shaft 231 of the second connection part 23 passes through the third connection hole and is rotatably connected to the support. In order to improve the connection strength between the connection assembly 2 and the chassis assembly 3, preferably, the connection assembly 2 is rotatably connected to the chassis assembly 3 through the snap-fit assembly 4.

Figure 5:
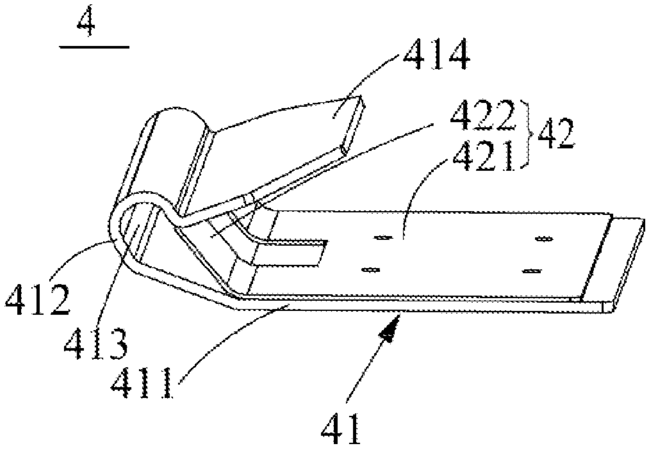
FIG. 5 is a stereogram of a snap-fit assembly in FIG. 1.

Please refer to FIG. 5, the lamp mounting structure 100 further includes the snap-fit assembly 4. The snap-fit assembly 4 is fixedly connected to the side of the chassis assembly 3 facing the connection assembly 2 through welding, riveting, fasteners, or the like. The second connection part 23 is rotatably connected with the chassis assembly 3 through the snap-fit assembly 4.

The snap-fit assembly 4 includes a first snap-fit member 41 and a second snap-fit member 42. Preferably, the first snap-fit member 41 is made of a hard material such as sheet metal, and the second snap-fit member 42 is made of an elastic material such as an elastic sheet. Through the cooperation of the first snap-fit member 41 and the second snap-fit member 42, the second connection part 23 of the connection assembly 2 is fixed in the snap-fit assembly 4, and the second connection part 23 can rotate freely in the snap-fit assembly 4.

The first snap-fit member 41 includes a plate-shaped first fixing part 411. The first fixing part 411 is fixedly connected to the chassis assembly 3 through a fastener. One end of the first fixing part 411 close to the connection assembly 2 is bent upward and inward to form a bending part 412. A receiving groove 413 is formed between the bending part 412 and the first fixing part 411. The rotating shaft 231 of the second connection portion 23 passes through the receiving groove 413 and is rotatably connected to the first snap-fit member 41. An end of the bending part 412 extends obliquely in a direction away from the first fixing portion 411 to form a guide portion 414. The guide portion 414 can guide the rotating shaft 231 of the second connection portion 23 to quickly snap into the receiving groove 413.

The second snap-fit member 42 includes a plate-shaped second fixing part 421, and the second fixing part 421 is fixedly connected to the first fixing part 411. Preferably, the second fixing part 421 is surface-fitted above the first fixing part 411, and the second fixing part 421 and the first fixing part 411 are fixedly connected to the chassis assembly 3 through fasteners. The end of the second fixing part 421 close to the bending part 412 extends toward the direction of an interface part 415 where the bending part 412 and the guide portion 414 are connected to form a limiting part 422. The limiting part 422 contacts the interface part 415 to limit the position, to allow the rotating shaft 231 of the second connection part 23 to be limited and fixed in the receiving groove 413. Because the second snap-fit member 42 is an elastic sheet, in a case that the rotating shaft 231 of the second connection part 23 enters the receiving groove 413 under the guidance of the guide portion 414 or when the rotating part is to be moved out of the receiving groove 413, the elastic sheet undergos elastic deformation under the external force, so as to facilitate the rotating shaft 231 to enter the receiving groove 413 or to move the rotating shaft 231 out of the receiving groove 413. When the external force disappears, the elastic deformation of the elastic sheet disappears and the elastic sheet returns to the original position. Providing the second snap-fit member 42 made of the elastic material can facilitate the connection and disassembly of the connection assembly 2 and the snap-fit assembly 4, and the mounting efficiency is improved.

Figure 6:
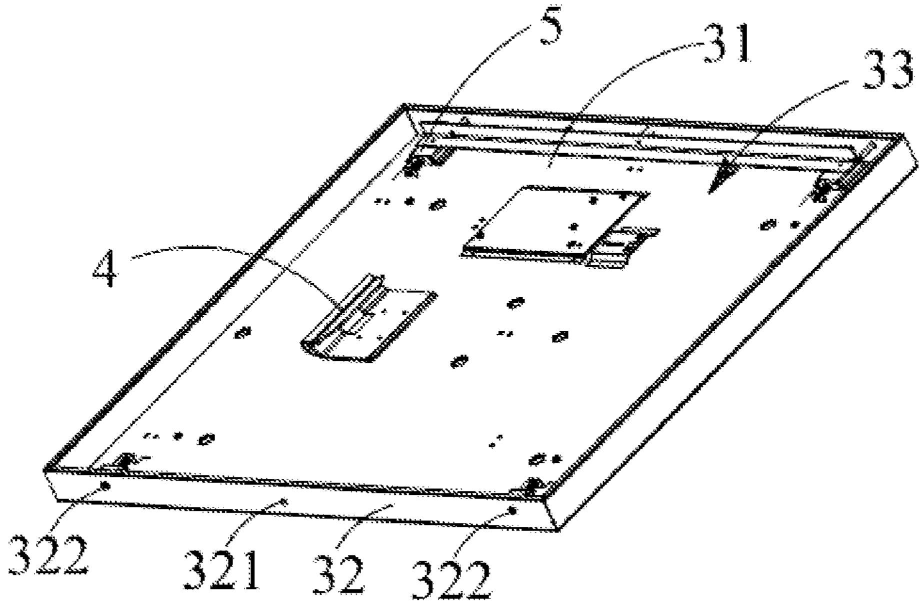
FIG. 6 is a stereogram of the lamp mounting structure in FIG. 1 with the connection assembly and the mounting assembly removed.

Please refer to FIG. 6, the chassis assembly 3 includes a bottom plate 31 and side walls 32 surrounding the bottom plate 31. The side walls 32 extend from all sides of the bottom plate 31 in a direction close to the mounting assembly 1. The side walls 32 and the bottom plate 31 jointly form a receiving space 33, which is used to accommodate the snap-fit assembly 4, the second lock catch part 5 and the connection assembly 2, so that the chassis assembly 3 can be installed on the mounting assembly 1 closely to improve the aesthetics of the lamp.

At least one second lock catch part 5 is provided on the chassis assembly 3 at a position corresponding to the first lock catch part 111. The first lock catch part 111 and the second lock catch part 5 cooperate with each other in a lock catch manner to quickly lock the chassis assembly 3 on the mounting assembly 1 and complete the mounting of the lamp. It can be understood that, the shape of the second lock catch part 5 can be realized by different structures, as long as the second lock catch part 5 can be used and matched with the first lock catch part 111. The number and the position of the second lock catch part 5 also correspond to those of the first lock catch part 111, which is not limited by the present disclosure.

Figure 7:
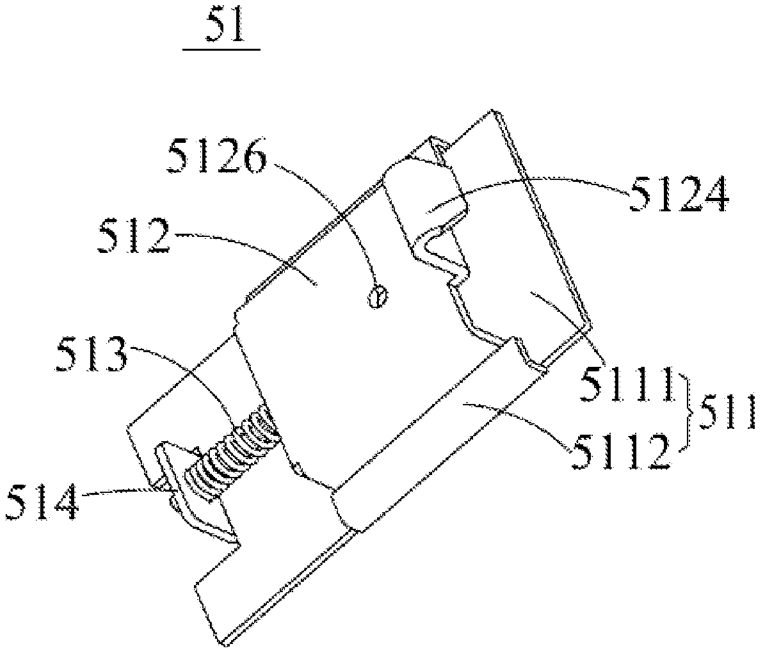
FIG. 7 is a stereogram of a self-locking structure in FIG. 1.
Figure 8:
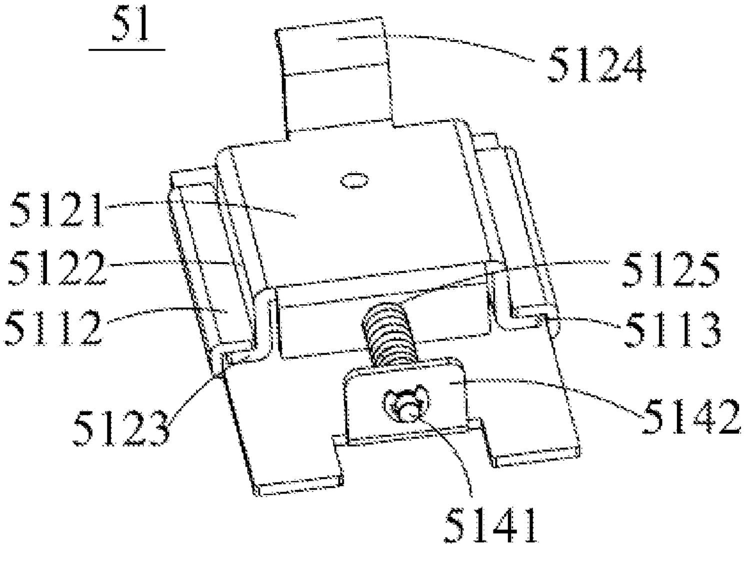
FIG. 8 is a stereogram of the self-locking structure in FIG. 7 from another angle.

Please refer to FIG. 7 to FIG. 8, and in conjunction with FIG. 1, in an example of the present disclosure, the second lock catch part 5 includes a self-locking structure 51 and a detachment assembly 52. The detachment assembly 52 includes a detachment button 521 and a transmission part 522. Through the locking cooperation of the self-locking structure 51 and the first lock catch part 111, and through the detachment button 521 and the transmission part 522 quickly unlocking the locking cooperation of the self-locking structure 51 and the first locking part 111, quick mounting and disassembly can be realized by a single person.

Please refer to FIG. 7 and FIG. 8, the self-locking structure 51 includes a slide rail 511, a sliding part 512, an elastic member 513 and a limiting member 514. The slide rail 511 includes a horizontal portion 5111 parallel to the chassis structure and a pair of limiting edges 5112 extending upward and bending from the edges of the horizontal portion 5111. The slide rail 511 is fixedly installed on the chassis assembly 3 through the horizontal portion 5111. A sliding groove 5113 is formed between the horizontal portion 5111 and the limiting edges 5112, and the sliding part 512 is slidably connected to the slide rail 511 through the sliding groove 5113. Further, the sliding part 512 includes a sliding cover 5121 and a side 5122 extending from an edge of the sliding cover 5121 toward a direction close to the horizontal portion 5111. A pair of sides 5122 corresponding to the limiting edges 5112 extend toward the connection direction of the limiting edge 5112 and the horizontal portion 5111, to form sliding sides 5123 parallel to the horizontal portion 5111. The sliding sides 5123 are limited and connected in the sliding groove 5113 under the action of the limiting edge 5112, and can slide freely in the sliding groove 5113. A latching portion 5124 is provided at a position of the sliding portion 512 corresponding to the first lock catch part 111 and is connected to the first lock catch part 111 in a lock catch manner. Preferably, the latching portion 5124 is an upside-down buckle that matches the L-shaped hook of the first lock catch part 111. The first lock catch part 111 and the latching portion 5124 are locked and connected through the cooperation of the buckle and the hook. A side 5122 of the sliding part 512 away from the latching portion 5124 is provided with a through hole 5125. The limiting member 514 includes a limiting shaft 5141 and a limiting block 5142 vertically connected to the limiting shaft 5141. One end of the limiting shaft 5141 away from the limiting block 5142 passes through the through hole 5125 to be slidably connected to the sliding part 512. The elastic member 513 is sleeved on the limiting shaft 5141 and is clamped between the sliding part 512 and the limiting block 5142. Preferably, the elastic member 513 is a spring that maintains the tendency to return to its original position when subjected to elastic deformation.

Figure 9:
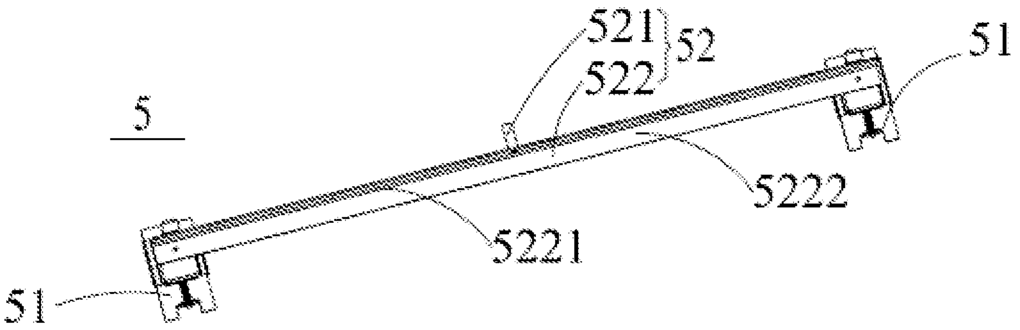
FIG. 9 is a stereogram of a second lock catch part in FIG. 1.
Figure 10:
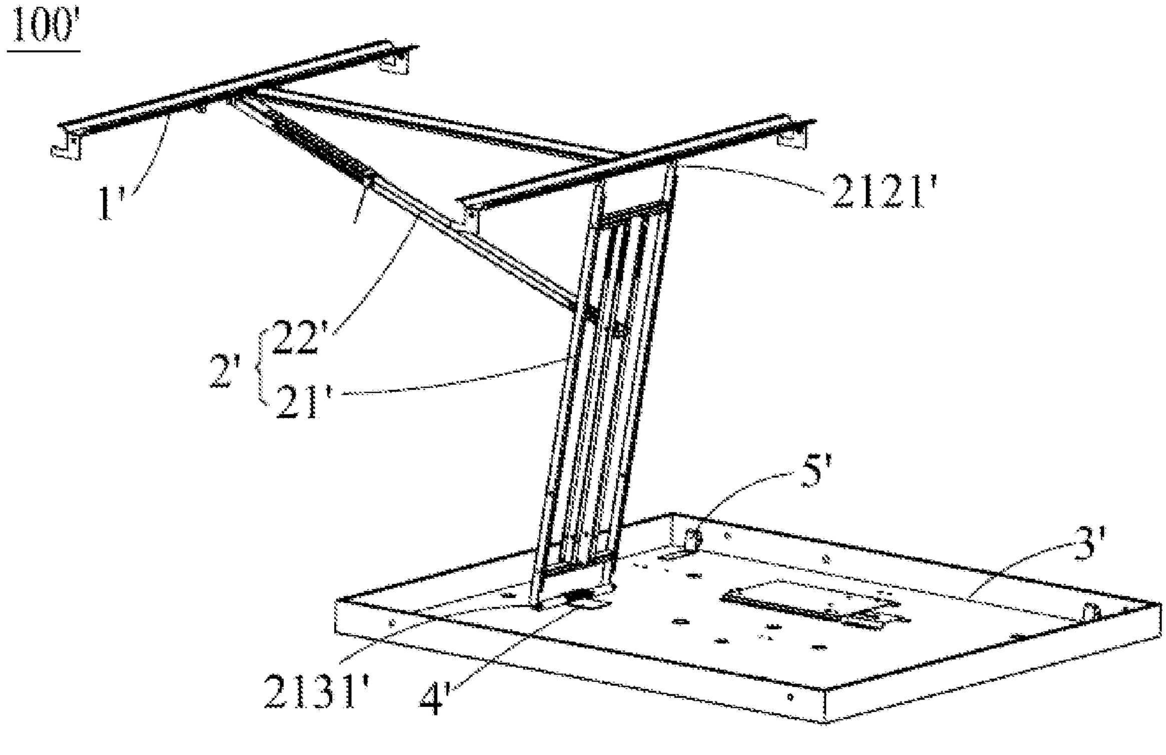
FIG. 10 is a stereogram of a lamp mounting structure provided by a second example of the present disclosure.

Referring to FIG. 9, the transmission part 522 includes a first transmission part 5221 parallel to the side wall 32 of the chassis assembly 3 and a second transmission part 5222 perpendicular to the first transmission part 5221. The fixing member passes through the third fixing hole 322 to fixedly connect the first transmission part 5221 to the side wall 32 of the chassis assembly 3. The disassembly button 521 passes through the first fixing hole 321 on the side wall 32 of the chassis assembly 3 to be fixedly connected with the first transmission part 5221 of the transmission part 522. The fixing member passes through the second fixing hole 5126 on the sliding cover 5121 to fixedly connect the second transmission part 5222 of the transmission part 522 with the sliding cover 5121 to drive the sliding part 512 to slide relative to the slide rail 511.

Furthermore, each self-locking structure 51 may be provided with a transmission part 522 and a disassembly button 521. By pressing the disassembly button 521, the locking cooperation of the second lock catch part 5 and the first lock catch part 111 can be quickly unlocked. Preferably, in order to save costs and improve disassembly efficiency, the transmission part 522 is fixedly connected to the sliding parts 512 of the two self-locking structures 51 to drive the two sliding parts 512 to slide synchronously.

The present disclosure further provides a lamp, which includes a lamp main body (not shown) and the above lamp mounting structure 100. The lamp main body and the side of the chassis assembly 3 away from the connection assembly 2 are fixedly connected through fasteners such as screws.

When the lamp needs to be installed, the first connection part 22 of the connection assembly 2 and the mounting assembly 1 are rotatably connected through the connection member 222, then the mounting assembly 1 with the connection assembly 2 is fixedly connected on the mounting wall, and the snap-fit assembly 4 and the second lock catch part 5 are fixedly installed in the receiving space 33 of the chassis assembly 3, and then the lamp main body is fixedly connected to the side of the chassis assembly 3 away from the connection assembly 2 through a fixing member. The chassis assembly 3 with the lamp main body is pushed up so that the second connection part 23 of the connection assembly 2 is rotatably connected to the snap-fit assembly 4. In this case, due to the effective engagement of the connection assembly 2 and the snap-fit assembly 4, the lamp main body can be temporarily placed in the air to facilitate connection to the electric supply, thereby avoiding positioning difficulties due to line of sight, and improving visibility. The chassis assembly 3 is pushed upward again, to allow the chassis assembly 3 to rotate around the first rotating part 223 between the connection assembly 2 and the mounting assembly 1, thereby realizing the upward rotational motion of the lamp main body around the rod, and at the same time realizing the transposition requirements for suspended operations. The second lock catch part 5 cooperates with the first lock catch part 111 in a lock catch manner, to fix the lamp main body on the mounting assembly 1, and in this case, the connection assembly 2 is received in the receiving space 33 of the chassis assembly 3, so as to improve the aesthetics of the lamp.

When it is necessary to disassemble the lamp main body, simply press the disassembly button 521. The disassembly button 521 drives the transmission part 522 to move toward the direction close to the sliding part 512, so that the sliding cover 5121 moves on the limiting shaft 5141 toward the direction close to the limiting block 5142, the elastic member 513 is compressed to unlock the lock connection between the latching portion 5124 and the first lock catch part 111, and the lamp main body slowly leaves the mounting assembly 1, because the connection assembly 2 and the snap-fit assembly 4 are effectively engaged, the lamp main body can be temporarily fixed in the air to prevent the lamp main body from falling quickly to damage the lamp main body or causing safety accidents, and to achieve quick mounting and disassembly by a single person.

Second Example

Referring to FIG. 10 to FIG. 23, the second example of the present disclosure provides a lamp mounting structure 100', which includes: a mounting assembly 1', a connection assembly 2' and a chassis assembly 3'. The mounting assembly 1' is fixedly installed on a mounting wall, the chassis assembly 3' is fixedly connected to a lamp main body. The connection assembly 2' includes a first connection assembly 21' and a second connection assembly 22'. Two ends of the first connection assembly 21' are respectively rotatably connected to the mounting assembly 1' and the chassis assembly 3' to form a first rotating part 2121' and a second rotating part 2131'; one end of the second connection assembly 22' is rotatably connected to an end of the first installation part 11' away from the first rotating part 2121', and the other end of the second connection assembly 22' is rotatably connected to the second connection assembly 22' located between the first rotating part 2121' and the second rotating part 2131'. The mounting assembly 1' is provided with a first lock catch part 111', and at least one second lock catch part 5' is provided at a position, corresponding to the first lock catch part 111', of the chassis assembly 3', and the first lock catch part 111' is connected with the second lock catch part 5' in a lock catch manner. By providing the connection assembly 2', the lamp can be installed in a time-saving, labor-saving, efficient and safe manner, especially for the lamp with a heavy weight, and a single person can complete the mounting and disassembly, which reduces the mounting cost and avoids damage to the lamp during the mounting process. Through the relative sliding and locking connection between the first sliding part 221' and the second sliding part 222' and the relative sliding, relative rotation and snap-fit connection between the first connection assembly 21' and the second connection assembly 22', it can realize the up and down reciprocating movement of the entire lamp mounting structure 100' and the space storage effect of the connection assembly 2', at the same time, it can realize the self-locking effect of the lamp, and avoid the risk of falling when mounting, and improve the convenience of mounting.

Figure 11:
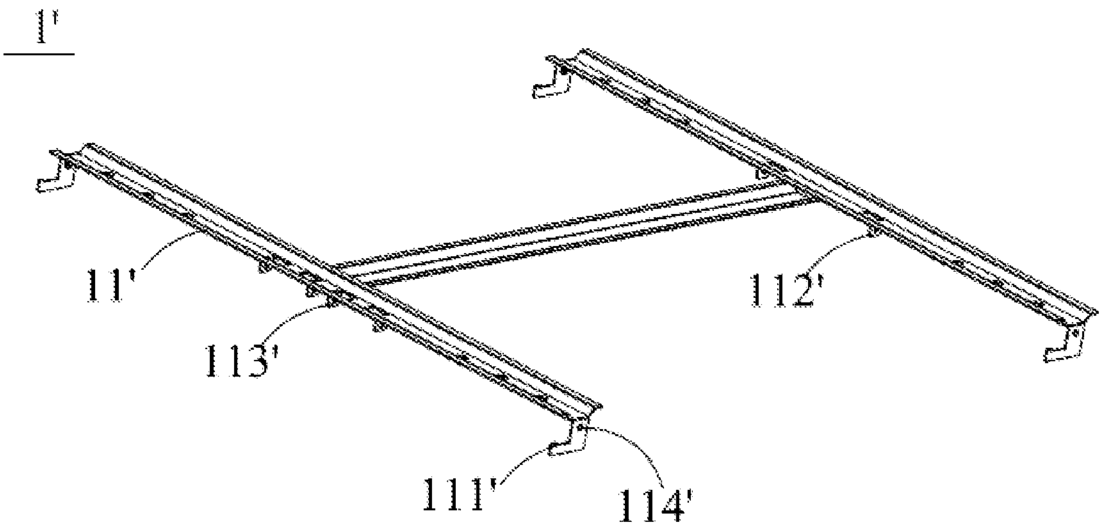
FIG. 11 is a stereogram of a mounting assembly in FIG. 10.
Figure 12:
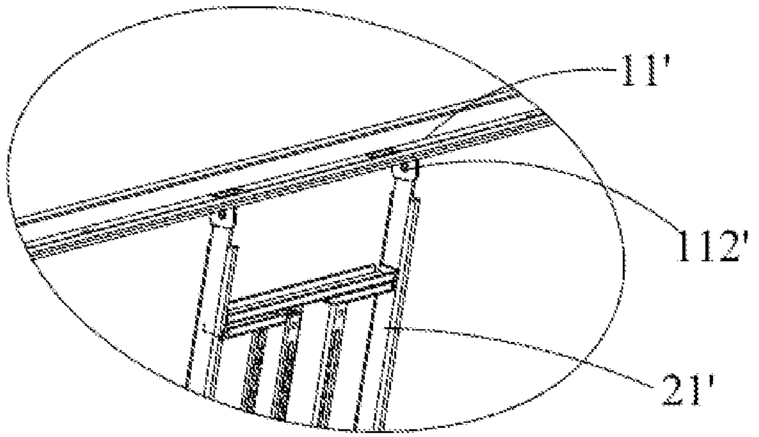
FIG. 12 is a partial enlarged view of FIG. 10.
Figure 13:
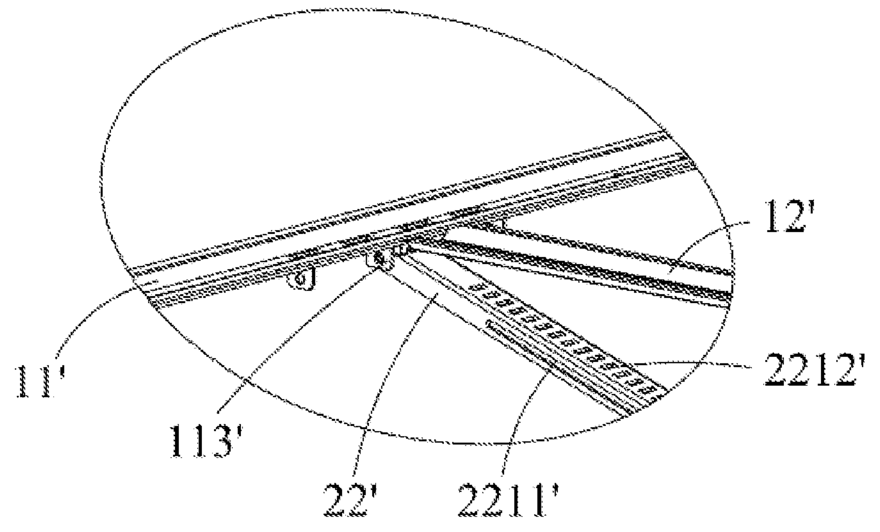
FIG. 13 is another partial enlarged view of FIG. 10.

Please refer to FIG. 11 to FIG. 13, the structure of the mounting assembly 1' of the present disclosure is basically the same as that in the first example, which is not described in detail here in the present disclosure. The mounting assembly 1' includes a pair of first installation parts 11' parallel to each other and a second installation part 12' perpendicular to the first installation parts 11'. Each of the first installation parts 11' is provided with a first lock catch part 111', the chassis assembly 3' is provided with at least one second lock catch part 5' at a position corresponding to the first lock catch parts 111', and the first lock catch part 111' is connected to the second lock catch part 5' in a lock catch manner. By providing the locking cooperation of the first lock catch part 111' and the second lock catch part 5', the mounting difficulty of the lamp is reduced, the mounting efficiency of the lamp is improved, single-person mounting and disassembly is realized, and the mounting cost is reduced. It should be noted that, the specific number and arrangement positions of the first lock catch part 111' and the second lock catch part 5' are not limited in the present disclosure, as long as the first lock catch part 111' and the second lock catch part 5' are arranged correspondingly, or the first lock catch part 111' and the second lock catch part 5' can also be flexibly arranged according to the specific structures of the mounting assembly 1' and the lamp.

Preferably, first lock catch parts 111' are provided on a side of the first installation part 11' away from the mounting wall. There are four first lock catch parts 111', each of the first lock catch parts 111' is provided at the end of the first installation parts 11', and the first lock catch parts 111' are symmetrically distributed on two sides of each of the first installation parts 11'. With such an arrangement, the lamp can be hung on the mounting assembly 1' smoothly and with balanced force during the mounting process.

Same as the first example, the ends, at the side away from the mounting wall, of each first installation part 11' extend downward to form the L-shaped first lock catch parts 111'. Preferably, the L-shaped first lock catch parts 111' are L-shaped hooks. The horizontal extension direction of each of the hooks is the same to facilitate locking cooperation with the second lock catch part 5' on the chassis assembly 3'. The first lock catch parts 111' are further provided with second locking holes 114' for cooperating with the first locking holes 321' on the chassis assembly 3' to fixedly connect the chassis assembly 3' with the mounting assembly 1'.

Please refer to FIG. 13 and in conjunction with FIG. 11, the difference between the second example and the first example is that at the position, corresponding to the second connection assembly 22', of the first installation part 11' that is not provided with the third connection part 112' is provided with a fourth connection part 113', and an end of the second connection assembly 22' away from the first connection assembly 21' is rotatably connected to the first installation part 11' through a connection member, so that the first installation part 11' and the second connection assembly 22' are rotatably connected, and the second connection assembly 22' can be rotated relative to the mounting assembly 1'.

Figure 14:
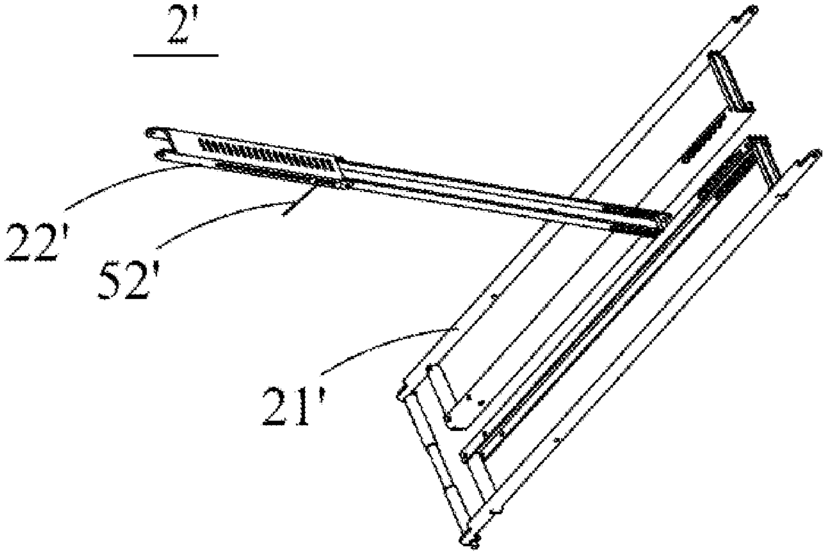
FIG. 14 is a stereogram of a connection assembly in FIG. 10.

Please refer to FIG. 14, the connection assembly 2' of the present disclosure includes a first connection assembly 21' and a second connection assembly 22'. Two ends of the first connection assembly 21' are rotatably connected to the mounting assembly 1' and the chassis assembly 3 respectively to form a first rotating part 2121' and a second rotating part 2131'. One end of the second connection assembly 22' is rotatably connected to an end of the first installation part 11' away from the first rotating part 2121', and the other end of the second connection assembly 22' is rotatably connected to the second connection assembly 22' between the first rotating part 2121' and the second rotating part 2131'.

Figure 15:
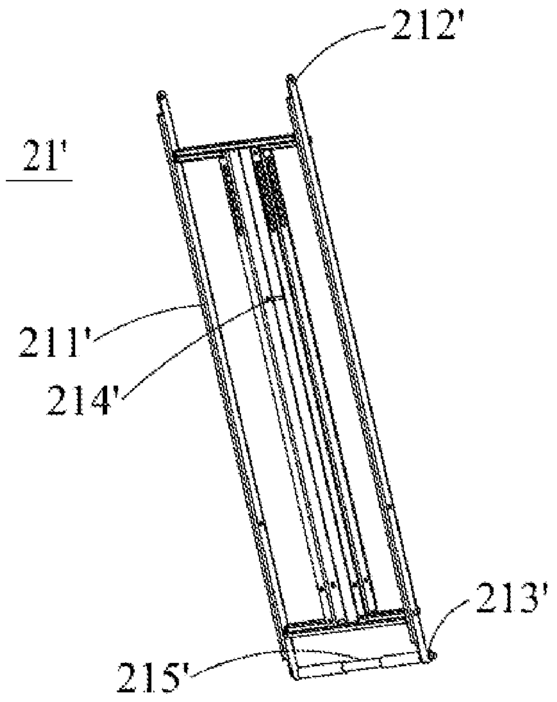
FIG. 15 is a stereogram of a first connection assembly in FIG. 14.
Figure 16:
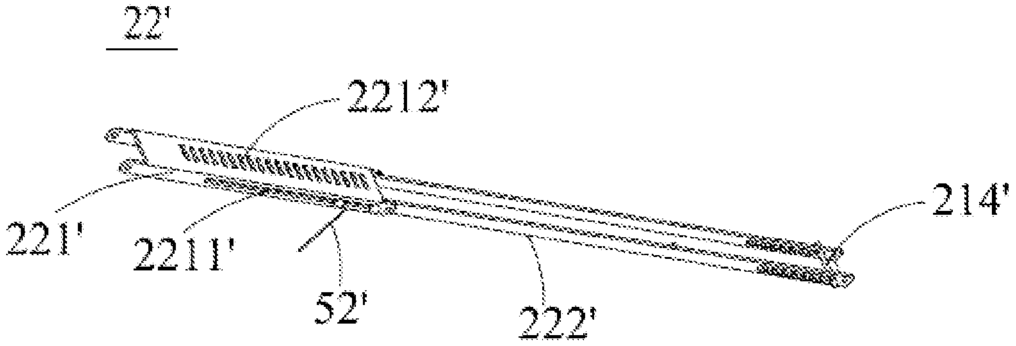
FIG. 16 is a stereogram of a second connection assembly in FIG. 14.
Figure 17:
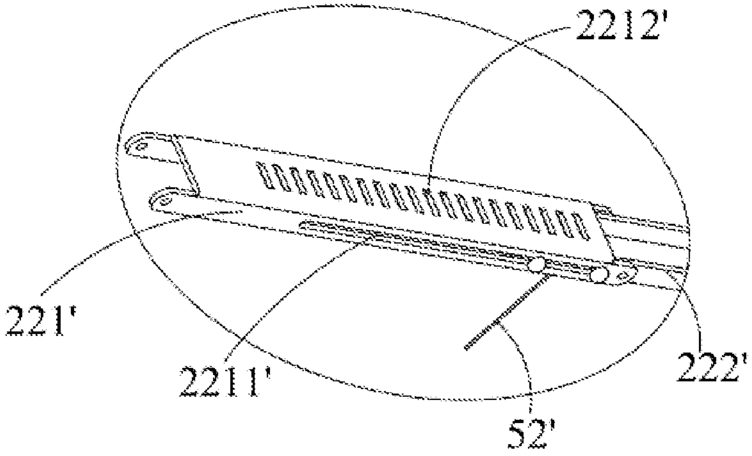
FIG. 17 is a partial enlarged view of FIG. 16.
Figure 18:
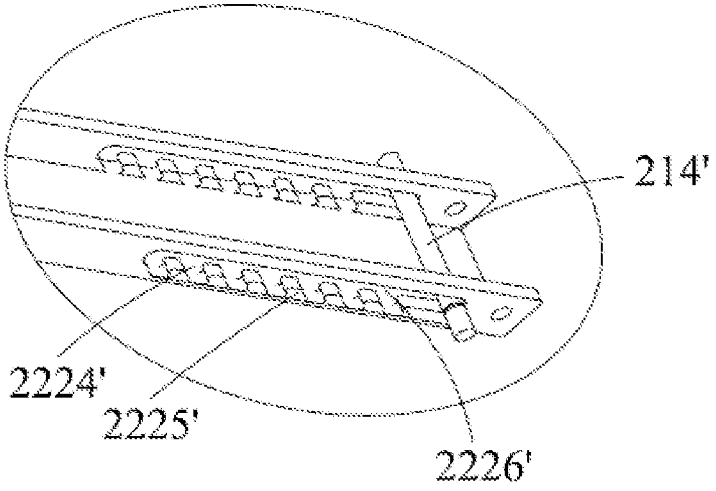
FIG. 18 is another partial enlarged view of FIG. 16.

Please refer to FIG. 15, the structure of the first connection assembly 21' is similar to the structure of the connection assembly 2' in the first example, the first connection assembly 21' includes a pair of connection rods 211' parallel to each other and includes a first connection part 212' and a second connection part 213' located respectively at two ends of each connection rod 211'. The mounting assembly 1' is rotatably connected to the first connection parts 212', and the chassis assembly 3' is rotatably connected to the second connection parts 213' to respectively form the first rotating part 2121' and the second rotating part 2131'. There is a gap between the two connection rods 211' of the first connection assembly 21', and the gap is used to accommodate the second connection assembly 22', so as to facilitate the space storage effect of the connection assembly 2' after the lamp is installed.

Please refer to FIG. 16 to FIG. 20, the second connection assembly 22' includes a first sliding part 221' and a second sliding part 222'. The first sliding part 221' is rotatably connected to the fourth connection part 113' on the mounting assembly 1' through a connection member, the connection member may be a rotating pin, a rotating rivet or a rotating shaft, etc., which is not limited in the present disclosure. The second sliding part 222' is rotatably connected to the second connection assembly 22' located between the first rotating part 2121' and the second rotating part 2131' through a second rotating shaft.

Furthermore, a guide groove 2211' is provided on a side of the first sliding part 221', and the guide groove 2211' extends from the connection position between the first sliding part 221' and the second sliding part 222' toward a direction close to the fourth connection part 113'. The second sliding part 222' is provided with a first guide shaft 2211' that is cooperatively connected with the guide groove 2211'. The first sliding part 221 'and the second sliding part 222' are capable of sliding relative to each other through the cooperation of the guide groove 2211 'and the first guide shaft 2211', to drive the second sliding part 222' to shrink closer to the direction of the first sliding part 221'.

Please refer to FIG. 16 to FIG. 20, the first sliding part 221' is further provided with a plurality of limiting grooves 2212', and the plurality of limiting grooves 2212' are spaced apart and parallel to the first guide shaft 2211'. A limiting elastic sheet 2222' is provided at an end of the second sliding part 222' close to the first guide shaft 2211'. One end of the limiting elastic sheet 2222' is bent upward to form a snap-fit part 2223'. When the relative sliding between the second sliding part 222' and the first sliding part 222' is stopped, the second sliding part 222' moves downward due to gravity. In this case, the snap-fit part 2223' of the limiting elastic sheet 2222' is automatically inserted into the limiting groove 2212' closest to the limiting elastic sheet 2222' under the action of elastic force, and the limiting elastic sheet 2222' is locked with the limiting groove 2212' to complete the self-locking effect between the first sliding part 221' and the second sliding part 222'.

Further, one end of the second sliding part 222' away from the limiting groove 2212' is rotatably connected to the first connection assembly 21' through the second guide shaft 214'. Specifically, a second guide rotating shaft 215' is fixedly connected to the first connection assembly 21', and a rotating shaft groove 2224' is provided on the end of the second sliding part 222' close to the first connection assembly 21'. The second guide shaft 214' passes through the rotating shaft groove 2224', so that the second sliding part 222' can slide relative to the first connection assembly 21'. Preferably, there is a gap 2226' between the top of the stuck slot 2225' and the top of the side surface of the rotating shaft groove 2224', and the second guide shaft 214' can slide relatively in the rotating shaft groove 2224' through the gap 2226'. Further, the stuck slot 2225' is provided at the bottom of the side surface of the rotating shaft groove 2224', and the stuck slot 2225' is snap-connected to the second guide shaft 214'. When an external force is applied to the second sliding part 222', the second guide shaft 214' relatively slides in the rotating shaft groove 2224' through the gap 2226' under the action of the external force. When the external force is quickly released, under the gravity of the lamp main body, the second guide shaft 214' falls into the stuck slot 2225' in the rotating shaft groove 2224', and is snap-connected with the stuck slot 2225', so that the second sliding part 222' and the first connection assembly 21' achieve the self-locking effect.

Figure 19:
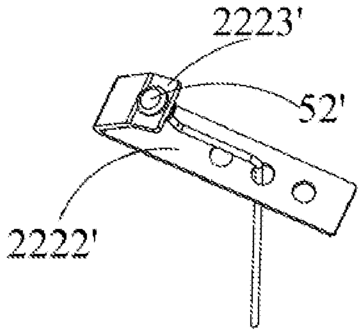
Figure 20:
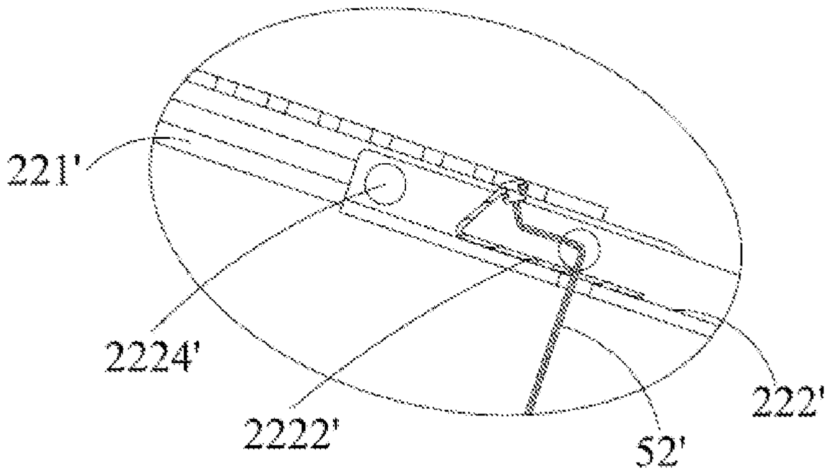
FIG. 20 is a partial cross-sectional view of FIG. 16.

Please refer to FIG. 19 to FIG. 20, the lamp mounting structure 100' further includes a detachment assembly 52'. One end of the detachment assembly 52' is fixedly connected to the snap-fit part 2223', and the other end of the detachment assembly 52' extends from the detachment hole on the second sliding part 222'. Preferably, the detachment assembly 52' is a steel wire rivet, the steel wire is wrapped around the rivet, the rivet is fixedly connected to the snap-fit part 2223' of the limiting elastic sheet 2222'. The steel wire penetrates the limiting elastic sheet 2222' and the second sliding part 222' and has a protruding part extending outward. The protruding part is accommodated in the receiving space 33' of the chassis assembly 3', and the aesthetics of the lamp mounting structure 100' can be improved by setting the rubber plug on the protruding part, which can avoid the lamp mounting structure 100' from being damaged by the steel wire during the mounting and disassembly process. When the steel wire rivet is pulled, the limiting elastic sheet 2222' can slide out from the limiting groove 2212' to unlock the locking connection between the first sliding part 221' and the second sliding part 222'. In this case, during the slow descent of the lamp main body, the weight of the lamp main body is utilized to achieve synchronous unlocking of the first connection assembly 21' and the second connection assembly 22'. By providing the detachment assembly 52', the locking connection between the first sliding part 221' and the second sliding part 222' and the snap-fit connection between the first connection assembly 21' and the second connection assembly 22' can be easily unlocked, to achieve free mounting and tool-free disassembly.

Figure 21:
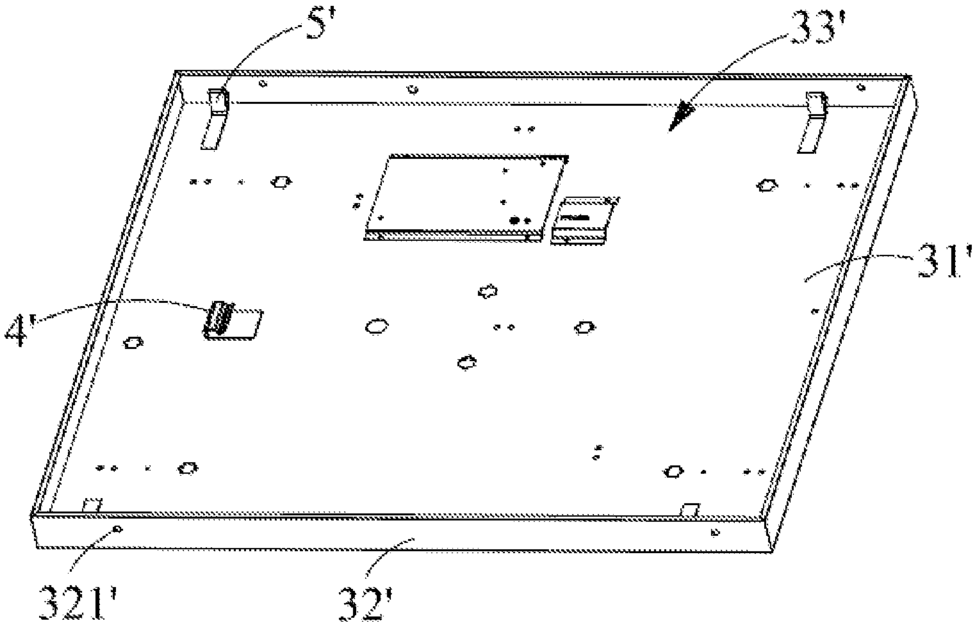
FIG. 21 is a stereogram of the lamp mounting structure in FIG. 10 with the connection assembly and the mounting assembly removed.

Please refer to FIG. 21, the chassis assembly 3' includes a bottom plate 31' and side walls 32' surrounding the bottom plate 31'. The side walls 32' extend from the all sides of the bottom plate 31' in a direction close to the mounting assembly 1'. The side walls 32' and the bottom plate 31' jointly form a receiving space 33' to accommodate the snap-fit assembly 4', the second lock catch part 5' and the installation component 2', so that the chassis assembly 3' is tightly fitted onto the mounting assembly 1' to improve the aesthetics of the lamp.

Figure 22:
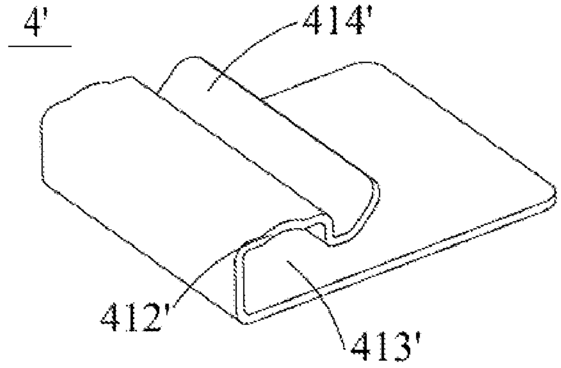
FIG. 22 is a stereogram of a snap-fit assembly in FIG. 10.

Please refer to FIG. 22 and in conjunction with FIG. 21, the lamp mounting structure 100' further includes a snap-fit assembly 4', which is fixedly connected to the side of the chassis assembly 3' facing the connection assembly 2', and an end of the first connection assembly 21' away from the mounting assembly 1' is rotatably connected to the chassis assembly 3' through the snap-fit assembly 4'. The snap-fit assembly 4' may be the same as the snap-fit assembly 4 of the first example, or may be different from the snap-fit assembly 4 of the first example, and the present disclosure is not limited thereto. Preferably, in the present example, the snap-fit assembly 4' is not completely the same as the snap-fit assembly 4 of the first example. The snap-fit assembly 4' is not provided with the second snap-fit member, but instead, the snap-fit assembly 4' is bent downward and inward at the connection between the bending part 412' and the guide portion 414' to limit and connect the rotating shaft 215' in the receiving groove 413'. Of course, the snap-fit assembly 4' can also be configured in other structures, as long as it can be effectively engaged with the connection assembly 2' to fix the lamp main body in the air and meet the transposition requirements of suspended operations.

Figure 23:
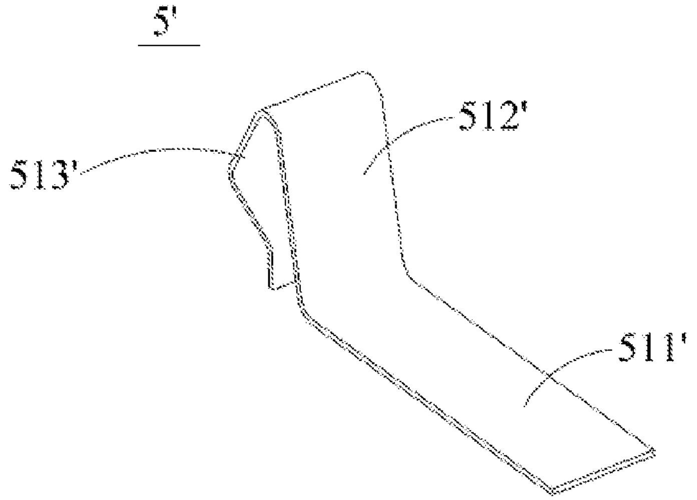
FIG. 23 is a stereogram of a second lock catch part in FIG. 10.

Please refer to FIG. 23 and in conjunction with FIG. 21, a second lock catch part 5' according to the second example of the present disclosure is provided. The second lock catch part 5' includes a joint part 511', a vertical part 512' and a clamping part 513' connected in sequence. The joint part 511' is fixedly connected to the chassis assembly 3', the vertical part 512' is perpendicular to the joint part 511', and an end of the vertical part 512' away from the joint part 511' is bent in a direction close to the vertical part 512' to form the clamping part 513', the clamping part 513' is snap-connected to the first lock catch part 111' to complete the locking connection between the chassis assembly 3' and the mounting assembly 1'.

The present disclosure further provides a lamp with the above lamp mounting structure 100', the lamp includes a lamp main body and the above lamp mounting structure 100'. The lamp main body is fixedly connected to a side of the chassis assembly 3' away from the connection assembly 2'.

In a case that the lamp needs to be installed, the first connection part 212' of the first connection assembly 21' and the first sliding part 221' of the second connection assembly 22' are first rotatably connected to the third connection part 112' and the fourth connection part 113' of the mounting assembly 1' respectively through the connection member, and then the mounting assembly 1' connected with the connection assembly 2' is fixedly connected to the mounting wall, and the snap-fit assembly 4' and the second lock catch part 5' are fixedly installed in the receiving space 33' of the chassis assembly 3', the lamp main body is then fixedly connected to the side of the chassis assembly 3' away from the connection assembly 2' through a fixing member. The chassis assembly 3' with the lamp main body is pushed up so that the second connection part 213' of the second connection assembly 22' is rotatably connected to the snap-fit assembly 4'. In this case, due to the effective engagement of the connection assembly 2' and the snap-fit assembly 4', the lamp main body can be temporarily placed in the air to facilitate connection to the electric supply, thereby avoiding positioning difficulties due to line of sight, and providing higher visibility. The chassis assembly 3' is pushed upward, due to the lateral separation between the first connection assembly 21' and the second connection assembly 22', the second sliding part 222' of the first connection assembly 21' slides inward relative to the first sliding part 221', when the second sliding part 222' reaches a certain mounting position, stop pushing. Because the external force disappears, the second sliding part 222' moves downward due to gravity, and the limiting elastic sheet 2222' automatically snaps into the nearest limiting groove 2212' under the action of elastic force to complete the self-locking effect of the first sliding part 221' and the second sliding part 222'. In this case, under the gravity of the lamp main body, the second guide shaft 214' falls into the stuck slot 2225 in the rotating shaft groove 2224', and snap-connected with the stuck slot 2225', so that the second sliding part 222' and the first connection assembly 21' complete the self-locking effect. With this arrangement, the lamp main body can be self-locked and stopped in the air at any time to facilitate electric supply connection or maintenance. Continue to push the chassis assembly 3' upward until the first guide shaft 2211' of the second sliding part 222' contacts the highest point of the guide groove 2211' of the first sliding part 221', in this case, the first connection assembly 21' moves with the second guide shaft 214' as a fulcrum for relative sliding around the guide groove 2211' of the second connection assembly 22'. The second connection assembly 22' is received in the first connection assembly 21'. The second lock catch part 5 in the chassis assembly 3' complete the locking connection with the first lock catch part 111' on the installation component 1'. In this case, the fastener passes through the first locking hole 321' on the chassis assembly 3' and the second locking hole 114' on the installation component 1', to fasten the fixing of the chassis assembly 3' and the installation component 1', thereby improving the stability of the lamp.

When it is necessary to disassemble the lamp main body, remove the fasteners, remove the rubber plug, pull down the steel wire rivet, and the limiting elastic sheet 2222' slides downward from the limiting groove 2212' to unlock the locking connection between the first sliding part 221 'and the second sliding part 222'. At the same time, during the slow descent of the lamp main body, the first connection assembly 21' and the second connection assembly 22' are synchronously unlocked with the help of the weight of the lamp main body. At the same time, due to the unique connection method between the mounting assembly 1', the connection assembly 2' and the chassis assembly 3', when the first connection assembly 21' and the second connection assembly 22' are unlocked, the lamp main body is transposed at the high altitude to unlock the locking connection between the latching portion and the first lock catch part 111', and the lamp main body slowly leaves the mounting assembly 1'. Because of the effective engagement of the connection assembly 2' and the snap-fit assembly 4', the lamp main body can be temporarily fixed in the air, which prevents the lamp main body from falling rapidly to damage the lamp main body or causing safety accidents, which enables quick mounting and disassembly by a single person.

To sum up, the lamp mounting structure 100' of the present disclosure, by providing the connection assembly 2', can save time, save effort, be efficient and safe to install lamps, especially for the heavier lamps, a single person can complete the mounting and disassembly, which reduces the mounting costs and avoids damage to the lamps during mounting. Through the relative sliding and locking connection between the first sliding part 221' and the second sliding part 222' and the relative sliding, relative rotation and snap-fit connection between the first connection assembly 21' and the second connection assembly 22', it can realize the up and down reciprocating movement of the entire lamp mounting structure 100' and the space storage effect of the connection assembly 2'. At the same time, it can realize the self-locking effect of the lamp, avoid the risk of falling when mounting, and improve the convenience of mounting. By providing the disassembly component 52', the locking connection between the first sliding part 221' and the second sliding part 222' and the snap-fit connection between the first connection assembly 21' and the second connection assembly 22' can be easily unlocked, which achieves free mounting and tool-free disassembly. In addition, the lamp mounting structure 100' and the lamp in the present disclosure can be provided independently and sold independently, thereby improving the versatility of each part of the structure and reducing the cost of the lamp.

The present disclosure is to provide a lamp mounting structure that is time-saving, labor-saving, efficient, safe, has high visibility, meets high-altitude transposition requirements, and can be installed and disassembled by a single person.

In order to achieve the object, the present disclosure provides a lamp mounting structure used for assembling a lamp on a mounting wall, the lamp mounting structure comprises: a mounting assembly, a connection assembly, and a chassis assembly, the mounting assembly is fixedly mounted on the mounting wall, the chassis assembly is fixedly connected with a lamp main body of the lamp; the connection assembly comprises a first connection assembly and a second connection assembly, two ends of the first connection assembly are rotatably connected with the mounting assembly and the chassis assembly respectively, to form a first rotating part and a second rotating part; one end of the second connection assembly is rotatably connected with an end, away from the first rotating part, of the mounting assembly, the other end of the second connection assembly is rotatably connected with the second connection assembly located between the first rotating part and the second rotating part, a first lock catch part is provided on the mounting assembly, at least one second lock catch part is provided at a position, corresponding to the first lock catch part, of the chassis assembly, and the first lock catch part and the second lock catch part are in a lock catch connection.

As a further improvement of the present disclosure, the second connection assembly comprises a first sliding part and a second sliding part, the first sliding part is provided with a guide groove, and the second sliding part is provided with a first guide shaft which is matched and connected with the guide groove, and the first sliding part and the second sliding part are capable of sliding relatively through a cooperation of the guide groove and the first guide shaft.

As a further improvement of this application, the first sliding part is further provided with a limiting groove, and an end of the second sliding part close to the first guide shaft is provided with a limiting elastic sheet, and an end of the limiting elastic sheet is bent upward to form a snap-fit part, and the snap-fit part is inserted into the limiting groove and in lock connection with the limiting groove.

As a further improvement of this application, the lamp mounting structure further comprises a detachment assembly, one end of the detachment assembly is fixedly connected to the snap-fit part, and the other end of the detachment assembly extends from a detachment hole in the second sliding part.

As a further improvement of this application, one end of the second sliding part away from the limiting groove is rotatably connected to the first connection assembly through a second guide shaft, and the second sliding part is provided with a rotating shaft groove, and the second guide shaft passes through the rotating shaft groove to allow the second sliding part to slide relative to the first connection assembly.

As a further improvement of this application, a bottom of a side surface of the rotating shaft groove is provided with a stuck slot, and the stuck slot is snap-connected with the second guide shaft.

As a further improvement of this application, a gap is provided between a top of the stuck slot and a top of a side surface of the rotating shaft groove, and the second guide shaft is capable of sliding relatively in the rotating shaft groove through the gap.

As a further improvement of this application, the lamp mounting structure further comprises a snap-fit assembly, the snap-fit assembly is fixedly connected to a side of the chassis assembly facing the connection assembly, and an end of the connection assembly away from the mounting assembly is rotatably connected to the chassis assembly through the snap-fit assembly.

As a further improvement of this application, the second lock catch part comprises a joint part, a vertical part and a clamping part connected in sequence, the joint part is fixedly connected to the chassis assembly, the vertical part is perpendicular to the joint part, and an end of the vertical part away from the joint part is bent toward a direction close to the vertical part to form a clamping part, and the clamping part is snap-connected with the first lock catch part.

Another object of the present disclosure is to provide a lamp comprising the above lamp mounting structure.

In order to achieve the object, the present disclosure provides a lamp, comprising a lamp main body and the above lamp mounting structure, the lamp main body is fixedly connected to a side of the chassis assembly away from the connection assembly.

The beneficial effects of the present disclosure are as follows. Compared with some technology, the present disclosure can save time and save effort, achieve efficient and safe mounting of lamps by providing the connection assembly, especially for lamps with heavy weight, and a single person can complete the installation and disassembly. Therefore, the installation cost is reduced and at the same time the damage to the lamps during the installation process is avoided.

By means of relative sliding and locking connection between the first sliding part and the second sliding part, as well as relative sliding, relative rotation, and locking connection between the first connection assembly and the second connection assembly, the up and down reciprocating movement of the entire lamp mounting structure and the spatial storage effect of the connection assembly can be achieved, and the self-locking effect of the lamp is also achieved, the risk of falling during the installation process is avoided, thereby improving the convenience of installation. By providing the disassembly component, the locking connection between the first sliding part and the second sliding part and the snap-fit connection between the first connection assembly and the second connection assembly can be easily released, which enables free mounting and tool-free disassembly. In addition, the lamp mounting structure and the lamp in the present disclosure can be provided independently and sold independently, thereby improving the versatility of each part of the structure and reducing the cost of the lamp.

The above examples are only used to illustrate the technical solutions of the present disclosure and not to limit the present disclosure. Although the present disclosure has been described in detail with reference to the examples, those skilled in the art should understand that the technical solutions of the present disclosure can be modified or equivalently substituted, without departing from the spirit and scope of the technical solutions of the present disclosure.

The invention claimed is:

1. A lamp mounting structure, used for assembling a lamp on a mounting wall, wherein the lamp mounting structure comprises: a mounting assembly, a connection assembly, and a chassis assembly, and wherein:

the mounting assembly is fixedly mounted on the mounting wall, the chassis assembly is fixedly connected with a lamp main body of the lamp;

the connection assembly comprises a first connection assembly and a second connection assembly, two ends of the first connection assembly are rotatably connected with the mounting assembly and the chassis assembly, to form a first rotating part and a second rotating part; one end of the second connection assembly is rotatably connected with an end, away from the first rotating part, of the mounting assembly, the other end of the second connection assembly is rotatably connected with the second connection assembly located between the first rotating part and the second rotating part, and a first lock catch part is provided on the mounting assembly, at least one second lock catch part is provided at a position, corresponding to the first lock catch part, of the chassis assembly, and the first lock catch part and the second lock catch part are in a lock catch connection.

2. The lamp mounting structure according to claim 1, wherein:

the second connection assembly comprises a first sliding part and a second sliding part, the first sliding part is provided with a guide groove, and the second sliding part is provided with a first guide shaft which is matched and connected with the guide groove, and the first sliding part and the second sliding part are capable of sliding relatively through a cooperation of the guide groove and the first guide shaft.

3. The lamp mounting structure according to claim 2, wherein:

the first sliding part is further provided with a limiting groove, and an end of the second sliding part close to the first guide shaft is provided with a limiting elastic sheet, and an end of the limiting elastic sheet is bent upward to form a snap-fit part, and the snap-fit part is inserted into the limiting groove and in lock connection with the limiting groove.

4. The lamp mounting structure according to claim 3, wherein:

the lamp mounting structure further comprises a detachment assembly, one end of the detachment assembly is fixedly connected to the snap-fit part, and the other end of the detachment assembly extends from a detachment hole in the second sliding part.

5. The lamp mounting structure according to claim 3, wherein:

one end of the second sliding part away from the limiting groove is rotatably connected to the first connection assembly through a second guide shaft, and the second sliding part is provided with a rotating shaft groove, and the second guide shaft passes through the rotating shaft groove to allow the second sliding part to slide relative to the first connection assembly.

6. The lamp mounting structure according to claim 5, wherein:

a bottom of a side surface of the rotating shaft groove is provided with a stuck slot, and the stuck slot is snap-connected with the second guide shaft.

7. The lamp mounting structure according to claim 6, wherein:

a gap is provided between a top of the stuck slot and a top of a side surface of the rotating shaft groove, and the second guide shaft is capable of sliding relatively in the rotating shaft groove through the gap.

8. The lamp mounting structure according to claim 1, wherein:

the lamp mounting structure further comprises a snap-fit assembly, the snap-fit assembly is fixedly connected to a side of the chassis assembly facing the connection assembly, and an end of the connection assembly away from the mounting assembly is rotatably connected to the chassis assembly through the snap-fit assembly.

9. The lamp mounting structure according to claim 1, wherein:

the second lock catch part comprises a joint part, a vertical part and a clamping part connected in sequence, the joint part is fixedly connected to the chassis assembly, the vertical part is perpendicular to the joint part, and an end of the vertical part away from the joint part is bent toward a direction close to the vertical part to form a clamping part, and the clamping part is snap-connected with the first lock catch part.

10. A lamp, comprising a lamp main body and a lamp mounting structure, wherein:

the lamp mounting structure comprises a mounting assembly, a connection assembly, and a chassis assembly, and wherein:

the mounting assembly is fixedly mounted on the mounting wall, the chassis assembly is fixedly connected with a lamp main body of the lamp;

the connection assembly comprises a first connection assembly and a second connection assembly, two ends of the first connection assembly are rotatably connected with the mounting assembly and the chassis assembly respectively, to form a first rotating part and a second rotating part; one end of the second connection assembly is rotatably connected with an end, away from the first rotating part, of the mounting assembly, the other end of the second connection assembly is rotatably connected with the second connection assembly located between the first rotating part and the second rotating part, a first lock catch part is provided on the mounting assembly, at least one second lock catch part is provided at a position, corresponding to the first lock catch part, of the chassis assembly, and the first lock catch part and the second lock catch part are in a lock catch connection, and the lamp main body is fixedly connected to a side of the chassis assembly away from the connection assembly.

* * * * *